US009454613B2

(12) United States Patent
Li et al.

(10) Patent No.: US 9,454,613 B2
(45) Date of Patent: Sep. 27, 2016

(54) METHOD AND SERVER FOR SEARCHING INFORMATION

(71) Applicant: TENCENT TECHNOLOGY (SHENZHEN) COMPANY LIMITED, Shenzhen (CN)

(72) Inventors: Zhenxiao Li, Shenzhen (CN); Ge Chen, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 142 days.

(21) Appl. No.: 14/456,114

(22) Filed: Aug. 11, 2014

(65) Prior Publication Data
US 2014/0351247 A1 Nov. 27, 2014

Related U.S. Application Data

(63) Continuation of application No. PCT/CN2013/074718, filed on Apr. 25, 2013.

(30) Foreign Application Priority Data

May 7, 2012 (CN) .......................... 2012 1 0137565

(51) Int. Cl.
G06F 17/00 (2006.01)
G06F 17/30 (2006.01)

(52) U.S. Cl.
CPC ... G06F 17/30867 (2013.01); G06F 17/30011 (2013.01); G06F 17/3053 (2013.01)

(58) Field of Classification Search
CPC .............. G06F 17/30; G06F 17/3053; G06F 17/30867
USPC .................................................. 707/600–899
See application file for complete search history.

(56) References Cited

U.S. PATENT DOCUMENTS

| 8,938,463 B1 * | 1/2015 | Kim ................... G06F 17/30867 707/751 |
| 2006/0265399 A1 | 11/2006 | De Filippi |
| 2010/0153370 A1 | 6/2010 | Gollapudi et al. |

FOREIGN PATENT DOCUMENTS

| CN | 101055587 A | 10/2007 |
| CN | 101079039 A | 11/2007 |
| CN | 102004772 A | 4/2011 |
| CN | 102063488 A | 5/2011 |

OTHER PUBLICATIONS

International Search Report issued in corresponding International Application No. PCT/CN2013/074718 dated Jul. 18, 2013.
International Preliminary Report on Patentability issued in corresponding International Application No. PCT/CN2013/074718 dated Nov. 11, 2014.
Korean Office Action issued in corresponding Korean Application No. 10-2014-7020722 dated Oct. 21, 2015.
Japanese Office Action issued in corresponding Japanese Application No. 2014-555070 dated Jun. 30, 2015.

* cited by examiner

Primary Examiner — Isaac M Woo
(74) Attorney, Agent, or Firm — Fitzpatrick, Cella, Harper & Scinto

(57) ABSTRACT

The present application provides method of searching information. The method comprises: performing a searching request based on a searching request including one or more query words from a user terminal and initially ranking all the searched items; evaluating the position click ratio of each ranking position with respect to the query words; calculating a compensation factor of respective ranking position by dividing the evaluated position clicks ratio of each ranking position by the evaluated position clicks ratio of the first ranking positions; obtaining a ranking score of each initially ranked item by dividing the item clicks ratio of each initially ranked item by the compensation factor corresponding to the ranking positions of the initially ranked item; and re-ranking all the initially ranked items in descending order based on the ranking scores and then returning the re-ranked items to the user terminal.

9 Claims, 2 Drawing Sheets

METHOD AND SERVER FOR SEARCHING INFORMATION

CROSS REFERENCE TO RELATED APPLICATION

This application is a continuation of International Application No. PCT/CN2013/074718, filed on Apr. 25, 2013, which claims priority to Chinese patent application No. 201210137565.5 filed in the SIPO on May 7, 2012 with title of "INFORMATION SEARCH METHOD AND SERVER", the entire content of which is hereby incorporated by reference.

TECHNICAL FIELD

The present application relates to an information processing technique, and particularly to a method and a server of searching information.

BACKGROUND ART

With the development of information technique and the coming of the network era, it is more and more popular to search information to obtain the needed data by using the network.

Searching information includes the following steps. Firstly, a user terminal sends a search request including a query word to a server for searching. After receiving the search request, the server makes a search and obtains search resulting items, and then initially ranks all the search resulting items and feedback the ranked resulting item to the user terminal.

In general, a user click log is often used to initially rank the respective search resulting items. The user click log records the information on the respective query words inputted by the user, which includes the item clicks ratio of the respective search resulting item associated with the query word. The item clicks ratio of a search resulting item associated with the query word is a value obtained by dividing the total click times that the user clicks the search resulting item associated with the query word by the times that the user searches the query word.

At present, item clicks ratios are often used to rank search resulting items. Specifically, search resulting items are ranked in descending order of item clicks ratios. The item clicks ratio indicates directly the satisfaction degree of search result. In general, the more the clicks ratio of a search resulting item is, the higher the user satisfaction degree of the search results item is and thus the more highly the search result item should be ranked. However, the item clicks ratio itself is also affected by search result ranking. The topper a search resulting item is ranked, the greater the probability that the item is clicked is. Therefore, it not sure that the search result item is ranked highly based on the item clicks ratio is the item whose requirement degree of the user is high. Such case is called a sequence inaccuracy problem. The sequence inaccuracy problem demonstrates that ranking the search resulting items only based on item clicks ratios is not accurate and such ranking method is unfair for a search result item which is ranked lower.

In order to solve the sequence inaccuracy problem, a manual adjusting ranking method is often used to rank search resulting items. In this method, position compensation factors are set for the respective ranking positions. The ranking positions refer to the sequences of the search resulting items, such as the first position, the second position, the third position, the forth position, the fifth position . . . and so on. Each ranking position has a corresponding compensation factor is an empirical value obtained through manual adjusting and a set of adjusted compensation factors are suitable to all search result ranking.

The existing manual adjusting ranking method includes the following steps. Firstly, a user terminal sends a search request including a query word to a server for searching. After receiving the search request, the server makes a search and obtains search resulting items, reads the item clicks ratio of the respective search resulting items from the user click log, assigns a compensation factor to each ranking position, multiplies the item clicks ratio of the respective search resulting items by the corresponding compensation factor so as to obtain ranking scores of the search resulting items, and then ranks all the search resulting items in descending order of the ranking scores and feedbacks the ranked resulting item to the user terminal.

In the existing manual adjusting rank solutions, the compensation factor of each ranking position is an empirical value obtained through manual adjusting, and a set of adjusted compensation factors are applied to all search result rankings. Such method using an empirical value to determine the compensation factor is too coarse, and letting a set of compensation factors suit to all search result ranking will cause the compensation inaccurate, and therefore cause the ranking result can not satisfy the query requirement of the user.

SUMMARY OF INVENTION

The embodiment of the application provides information searching method and a server, so that the search results can be ranked more accurately, and the search results can better meet with the query requirement of the user.

According to an aspect of the present application, there is provided an information searching method, the method comprising:

performing a searching request based on a searching request including one or more query words from a user terminal and initially ranking all the searched items;

evaluating the position click ratio of each ranking position with respect to the query words;

calculating a compensation factor of respective ranking position by dividing the evaluated position clicks ratio of each ranking position by the evaluated position clicks ratio of the first ranking positions;

obtaining a ranking score of each initially ranked item by dividing the item clicks ratio of each initially ranked item by the compensation factor corresponding to the ranking positions of the initially ranked item; and Re-ranking all the initially ranked items in descending order based on the ranking scores and then returning the re-ranked items to the user terminal.

According to another aspect of the present application, there is further provided an information searching server, the server comprising: an evaluating unit, a ranking score obtaining unit and a rank feedback unit an evaluating unit, configured to perform a searching request based on a searching request including one or more query words from a user terminal and initially ranking all the searched items, and evaluate the position click ratio of each ranking position with respect to the query word;

a ranking score obtaining unit, configured to calculating a compensation factor of respective ranking position by dividing the evaluated position clicks ratio of each ranking position by the evaluated position click rate of the first ranking positions, and obtain a ranking score of each initially ranked item by dividing the item clicks ratio of each initially ranked items by the compensation factor corresponding to the ranking positions; and a ranking feedback unit, configured to re-rank all the initially ranked items in descending order based on the ranking scores and then return the re-ranked items to the user terminal It can be seen from the above solution, in the embodiment of the application, the compensation factor for each ranking position associated with a query word is not determined based on manually adjusted empirical values but calculated respectively, which causes the obtained compensation factors more accurate. Further, for different query words, different compensation factors for the ranking positions are determined, different ranking scores thus can be obtained, which avoids the case where a set of compensation factors is applied to all search result rankings Therefore, the search results can be ranked more accurately, and the search results can better meet with the query requirement of the user.

BRIEF DESCRIPTION OF THE DRAWINGS

In order to describe the embodiments of the disclosure more clearly, a brief description on the drawings which are made reference to in describing the present disclosure will be made below. Apparently, the drawings described below are only some embodiments of the disclosure and other drawings can be conceived based on the described drawings by the person skilled in the art without paying any inventive effort.

DETAILED DESCRIPTION

In order to make the technical solution and advantages of the application more apparent, in the following, a more detailed description of the application will be given in conjunction with the embodiment and the accompanying drawings.

Figure 1:
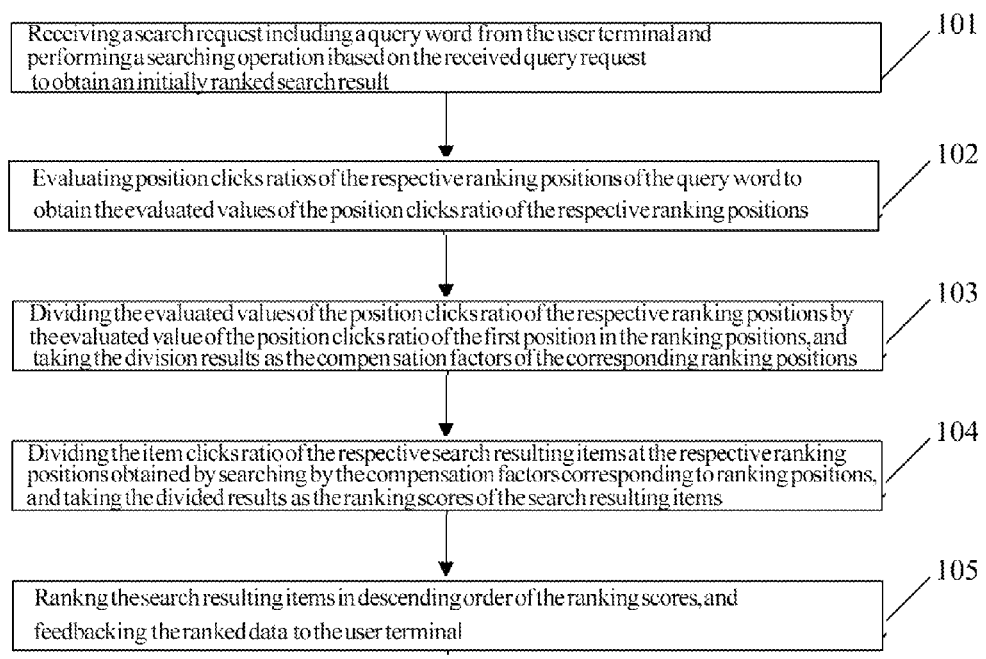
FIG. 1 is a schematic flow chart showing the information searching method of the present application.

In the embodiment of the application, the compensation factors of the respective ranking positions associated with a query word is obtained by calculation respectively, and the ranking scores of the search resulting items associated with the query word are obtained according to the calculation of the determined corresponding compensation factor, thereafter, the search result ranking is made according to the search results. Referring to FIG. 1, FIG. 1 is a schematic flow diagram showing the information searching method of the present application, it include the following steps.

In step 101, a search request including a query word is received from the user terminal and a searching operation is performed based on the received query request to obtain an initially ranked search result.

Figure 2:
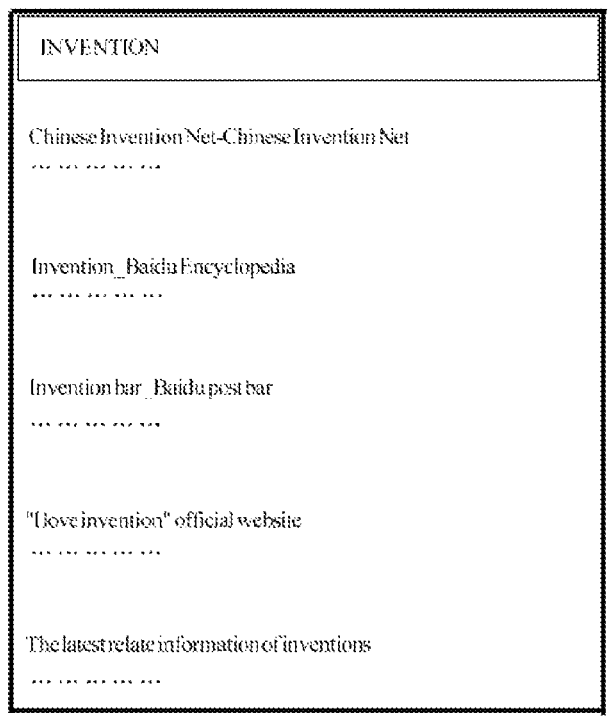
FIG. 2 is an example of the search resulting items associated with the query word "invention"

Specifically, the server receives a search request and makes a search based on the query word(s) to obtain search result items. And then, the server initially ranks the respective search resulting items to obtain the initially ranked search results. The initiate ranking can be implemented in any manners. For example, the initiate ranking can be implemented randomly or in a descending order of characteristic values such as the item clicks ratio of the search resulting items. Taking the query word "invention" as an example, FIG. 2 shows the search resulting items of the first 5 ranking positions related to "invention", the search result item in the first position is the search result item about "Chinese Invention Net", the search result item in the second position is the search result item about "Invention_Baidu Encyclopedia", the search result item in the third position is the search result item about "invention bar_Baidu post bar", the search result item in the forth position is the search result item about "'I love invention' official website", the search result item in the fifth position is the search result item about "the latest relate information of inventions". The apostrophes are the summaries of search resulting items.

In step 102, position clicks ratios of the respective ranking positions of the query word are evaluated to obtain the evaluated values of the position clicks ratio of the respective ranking positions.

The position clicks ratio of a ranking position associated with a query word is a value obtained by dividing the total times the user clicks the ranking position associated with the query word by the times the user searches the query word.

Evaluating the position clicks ratio of the respective ranking positions of a query word may be implemented in a machine learning method. An example will be provided below. Evaluating the position clicks ratio of the respective ranking positions of the query word described in this step comprises: selecting characteristics to obtain the value corresponded to by the characteristics associated with the query word; and evaluating the position clicks ratio of the respective ranking positions of the query word according to the obtained values and history clicking action information of the respective ranking positions using the machine learning method.

After selecting characteristics, the value corresponded to the characteristics associated with the query word may be obtained from the user click log. For the sake of illustration, the query word is expressed as q and at least one characteristic is selected. The user click log records the information the user searches respective query words, which includes the values the respective characteristics associated with the query word. The characteristics in the user click log record include the item clicks ratio of the respective search resulting items, page-turn ratio and the page clicks ratio associated with a query word and the like.

The item clicks ratio of a search result item associated with a query word refers to the value obtained by dividing the total times the user clicks the search result item associated with the query word by the times the user searches the query word.

The page-turn ratio refers to the page-turn ratio of different pages, for example, the page-turn ratio of Page 2, the page-turn ratio of Page 3, and so on. The page-turn ratio of a specified page refers to the value obtained by dividing the total times the user turns to the specified page associated with the corresponding query word by the times the user searches the query word. Taking the query word "invention" as an example, the page-turn ratio of Page 2 refers to the value obtained by dividing the total times the user turns from page 1 to Page 2 after searching the query word "invention" by the times the user searches the "invention", the page-turn ratio about Page 3 refers to the value obtained by dividing the total times the user turns from Page 2 to Page 3 after searching the query word "invention" by the times the user searches the "invention". When selecting the characteristic value used to evaluate, one or more page-turn ratio(s) may be selected.

The page clicks ratio refers to the clicks ratio of different pages such as the page clicks ratio of Page 2, the page clicks ratio of Page 3, and so on. The page clicks ratio of a specified page refers to the value obtained by dividing the total times the user clicks in the specified page associated with the corresponding query word by the times the user searches the query word. Taking the query word "invention" as an example, the page clicks ratio of Page 2 refers to the value obtained by dividing the total times the user clicks in Page 2 after searching the query word "invention" by the total times the user searches the "invention", the page clicks ratio about Page 3 refers to the value obtained by dividing the total times the user clicks in Page 3 after searching the query word "invention" by the total times the user searches the "invention". When selecting the characteristic value for evaluation, one or more page clicks ratio(s) may be selected.

The user click log includes the history clicking action information of the respective ranking positions. The history clicking action information generally refers to the search actions of the user associated with all query words during a period of time. Taking the history clicking action in the first position in a precious week as an example, the history clicking action includes the information that the first position is clicked or not clicked after the user searches the respective query word in a previous week. The click action of the first position after once a search is performed by the user is taken as a sample.

After obtaining the characteristic values of the selected characteristics associated with the query word q, the position clicks ratios of the respective ranking positions associated with the query word are evaluated by using a machine learning method based on the obtained characteristic values and the history click action information of the respective ranking positions. The machine learning method may be a logistic regression method or other probability classification model methods. As an example, the logistic regression method will be illustrated below.

It is assumed that the query word is set as q, the ranking position is set as p, the number of the selected characteristic values is set as m being a natural number, and the characteristic values at the ranking position p associated with the query word q are expressed as $f_{q,1}, f_{q,2} \ldots f_{q,m}$.

The click action at the ranking position p associated with the query word q is expressed as $C_{p,q}$ which is 1 if the ranking position p is clicked or is 0 if the ranking position p is not clicked. $p(C_{p,q}=1)$ indicates the clicked probability of the ranking position p associated with the query word q. The $p(C_{p,q}=0)$ indicates is the unclicked probability of the ranking position p associated with the query word q. As a result, the model of the relationship between the position clicking probability and characteristics is established as follows:

$$P(c_{p,q}=1) = \frac{1}{1+\exp(-\beta_{p,0}-\beta_{p,1}f_{q,1}\ldots-\beta_{p,m}f_{q,m})} \quad (1)$$

$$P(c_{p,q}=0) = 1 - \frac{1}{1+\exp(-\beta_{p,0}-\beta_{p,1}f_{q,1}\ldots-\beta_{p,m}f_{q,m})} \quad (2)$$

wherein, $\beta_{p,0}, \beta_{p,1} \ldots \beta_{p,m}$ are the parameters to be evaluated. $\beta_{p,0}, \beta_{p,1} \ldots \beta_{p,m}$ can be evaluated using a maximum likelihood method. Specifically, the evaluation method is as follows: for a given ranking position p, the clicking action of the ranking position p screened from the history click results of the user click log is taken as a sample, the likelihood function (3) can be obtained based on formula (1) and formula (2):

$$L(\beta_{p,o}, \beta_{p,1} \ldots \beta_{p,m}) = \quad (3)$$
$$\prod_{i=1}^{n}\left(\frac{1}{1+\exp(-\beta_{p,0}-\beta_{p,1}f_{qi,1}\ldots-\beta_{p,m}f_{qi,m})}\right)^{C_{p,qi}} \cdot$$
$$\prod_{i=1}^{n}\left(1-\frac{1}{1+\exp(-\beta_{p,0}-\beta_{p,1}f_{qi,1}\ldots-\beta_{p,m}f_{qi,m})}\right)^{1-C_{p,qi}}$$

Wherein, i (i=1~n) indicates the samples, n is a natural number, and $q_i$ is the query word of the samples. The likelihood function L ($\beta_{p,0}, \beta_{p,1} \ldots \beta_{p,m}$) or Log L($\beta_{p,0}, \beta_{p,1} \ldots \beta_{p,m}$) is maximized to obtain the evaluated values of $\beta_{p,0}, \beta_{p,1} \ldots \beta_{p,m}$. Maximizing the likehood function to evaluate the parameters therein is a prior art and its description is omitted herein.

For a given query word q, after obtaining the values of the $\beta_{p,0}, \beta_{p,1} \ldots \beta_{p,m}$, the obtained values $\beta_{p,0}, \beta_{p,1} \ldots \beta_{p,m}$ are substituted into the formula (1) to calculate P(Cp·q=1), i.e. the smoothed clicks ratio of the ranking position p associated with the query word q, which is also referred to as the evaluated value of the position clicks ratio of the ranking position p associated with the query word q.

In step 103, the evaluated values of the position clicks ratio of the respective ranking positions are divided by the evaluated value of the position clicks ratio of the first position in the ranking positions, and the division results are taken as the compensation factors of the corresponding ranking positions.

The position clicks ratio of a ranking position associated with a query word indicates the value obtained by dividing the total times the user clicks the ranking position by the times the user searches the query word. The position clicks ratio of the first position is the value obtained by dividing the total times the user clicks the first position associated with the query word by the times the user searches the query word. The evaluated value of the position clicks ratio is a value obtained by evaluating the position clicks ratio according to the present application.

In step 104, the item clicks ratio of the respective search resulting items at the respective ranking positions obtained by searching are divided by the compensation factors corresponding to ranking positions, the divided results are taken as the ranking scores of the search resulting items.

In step 105, the search resulting items are ranked in descending order of the ranking scores, and the ranked data are feedback to the user terminal.

In the above flow, in order to make the ranking of the search result items more accurate, the compensation factor obtained in step 103 can be revised. Specifically, the revising includes performing the exponential operation on the compensation factor and a predetermined exponent γ: (the compensation factor)^γ, and taking the operation result as the revised compensation factor. The predetermined exponent is a real number in [0, 1]. Adaptively, the step 104 of dividing the item clicks ratio of the respective search resulting items at the respective ranking positions by the compensation factors includes: dividing the item clicks ratio of the history search resulting items at the respective ranking positions by the revised compensation factor of the corresponding ranking positions.

In the present application, the compensation factors of the respective ranking positions associated with a query word are not determined by using the manually adjusted empirical value but calculated respectively so that the calculated compensation factors are more accurate. Moreover, for different query words, different ranking scores can be obtained based on the calculated compensation factors so as to avoid the case where a set of compensation factors is applied to all search result ranking Therefore, in the present application, the search results can be ranked more accurately and the search results can better meet with the query requirement of the user.

In addition, in the present application, the number of the manually determined parameters can be reduced to only one. That is, only the set exponent γ needs to be set manually so as to reduce the burden of manual adjusting.

Figure 3:
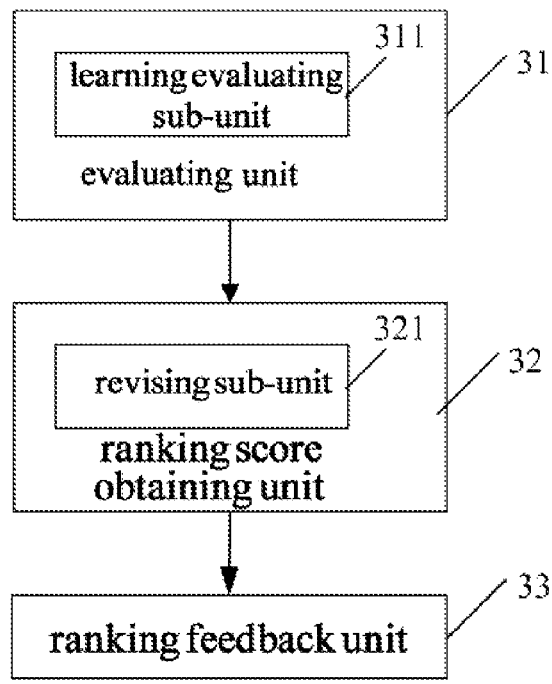
FIG. 3 is a schematic structural block diagram of an information searching server.

Referring to FIG. 3, FIG. 3 is a schematic block diagram of the structure of an information searching server. The server includes an evaluating unit 31, a ranking score obtaining unit 32 and a ranking feedback unit 33.

The evaluating unit 31 is configured to receive a search request including a query word from the user terminal, obtain the initially ranked search result through searching based on the search request, evaluate the position clicks ratio of the respective ranking positions associated with the query word, obtain the evaluated values of the position clicks ratio of the respective ranking positions, and transfer the evaluated values of the position clicks ratio to the ranking score obtaining unit 32;

the ranking score obtaining unit 32 is configured to divide the evaluated values of the position clicks ratio of the respective ranking positions by the evaluated values of the position clicks ratio of the first position of the ranking positions, take the divided results as the compensation factors of the corresponding ranking positions; divide the item clicks ratio of search resulting items at the respective ranking positions obtained through searching by the compensation factors of the corresponding ranking positions, take the divided results as ranking scores of the search resulting items, and transfer the ranking scores to the ranking feedback unit 33;

The ranking feedback unit 33 is configured to rank the search resulting items in descending order of the ranking scores and feedback the ranked data to the user terminal.

Alternatively, the evaluating unit 31 includes learning evaluating sub-unit 311. The learning evaluating sub-unit 311 is configured to select characteristics and read the value of the selected characteristics associated with the query word, and evaluate position clicks ratio of each ranking position with respect to the query word based on the obtained characteristic value and history clicks action information the respective ranking positions by using a machine learning method so as to obtain the evaluated values of the position clicks ratio of the respective ranking positions of the query word.

Alternatively, the ranking score obtaining unit 32 further includes a revising sub-unit 321 configured to revise the compensation factor by performing the exponential operation on the calculated compensation factor and a predetermined exponent and use the revised compensation factor as the compensation factor. The predetermined exponent is a real number in [0, 1]. Adaptively, the dividing the item clicks ratio of the respective search resulting items at the respective ranking positions by the compensation factors includes: dividing the item clicks ratio of the history search resulting items at the respective ranking positions by the revised compensation factor of the corresponding ranking positions.

The person skilled in the art can understand that the entire processes or part thereof described above may be implemented by hardware or by a computer program instructing relevant hardware. Said program may be stored in a computer-readable storage medium which may include a read-only memory (ROM), a magnetic disk, or a CD (compact disc) etc.

The descriptions of the various embodiments of the present invention have been presented only for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A method of searching information, comprising:
    performing a searching request based on a searching request including one or more query words from a user terminal and initially ranking all the searched items;
    evaluating the position clicks ratio of each ranking position with respect to the query words;
    calculating a compensation factor of respective ranking position by dividing the evaluated position clicks ratio of each ranking position by the evaluated position clicks ratio of the first ranking positions;
    obtaining a ranking score of each initially ranked item by dividing the item clicks ratio of each initially ranked item by the compensation factor corresponding to the ranking positions of the initially ranked item; and
    re-ranking all the initially ranked items in descending order based on the ranking scores and then returning the re-ranked items to the user terminal,
    wherein said evaluating the position clicks ratio of each ranking position with respect to each query words includes:
        selecting characteristics for evaluating the position clicks ratio of each ranking position with respect to the query word and obtaining a characteristic value corresponding to the characteristics; and
        evaluating, by using a machine learning method, the position clicks ratio of each ranking position with respect to the query word based on the obtained characteristic value and history clicks action information of the respective ranking positions.

2. The method of searching information according to claim 1, wherein the selected characteristics are page-turning ratio or page clicks ratio with respect to the query word.

3. The method of searching information according to claim 1, wherein the machine learning method is a logistic regression method.

4. The method of searching information according to claim 1, further comprising: after calculating a compensation factor of respective ranking position,
    revising the compensation factor by performing the exponential operation on the calculated compensation factor and a predetermined exponent and using the revised compensation factor the compensation factors, the predetermined exponent being a real number in the interval [0, 1].

5. A server of searching information, comprising:
    an evaluating unit, configured to perform a searching request based on a searching request including one or more query words from a user terminal and initially ranking all the searched items, and evaluate the position clicks ratio of each ranking position with respect to the query;

a ranking score obtaining unit, configured to calculate a compensation factor of respective ranking position by dividing the evaluated position clicks ratio of each ranking position by the evaluated position clicks ratio of the first ranking positions, and obtain a ranking score of each initially ranked item by dividing the item clicks ratio of each initially ranked item by the compensation factor corresponding to the ranking positions; and a ranking feedback unit, configured to re-rank all the initially ranked items in descending order based on the ranking scores and then return the re-ranked items to the user terminal, wherein the evaluating unit includes a learning evaluating sub-unit configured to select characteristics for evaluating the position clicks ratio of each ranking position with respect to each query word, obtain a characteristic value corresponding to the characteristics, and evaluate, by using a machine learning method, the position clicks ratio of each ranking position with respect to the query word based on the obtained characteristic value and history clicks action information of the respective ranking positions.

6. The server of searching information according to claim 5, wherein the selected characteristics are page-turning ratio or page clicks ratio with respect to the query word.

7. The server of searching information according to claim 5, wherein the machine learning method is a logistic regression method.

8. The server of searching information according to according to claim 7, the ranking score obtaining unit including a revising sub-unit configured to revise the compensation factor by performing the exponential operation on the calculated compensation factor and a predetermined exponent and use the revised compensation factor as the compensation factor, the predetermined exponent being a real number in the interval [0, 1].

9. A non-transient computer-readable information recording medium, on which sets of instructions are stored, wherein the sets of instructions, when executed, cause a machine to perform the steps of:

performing a searching request based on a searching request including one or more query words from a user terminal and initially ranking all the searched items;

evaluating the position clicks ratio of each ranking position with respect to the query words;

calculating a compensation factor of respective ranking position by dividing the evaluated position clicks ratio of each ranking position by the evaluated position clicks ratio of the first ranking positions;

obtaining a ranking score of each initially ranked item by dividing the item clicks ratio of each initially ranked item by the compensation factor corresponding to the ranking positions of the initially ranked item; and re-ranking all the initially ranked items in descending order based on the ranking scores and then returning the re-ranked items to the user terminal, wherein said evaluating the position clicks ratio of each ranking position with respect to each query words includes:

selecting characteristics for evaluating the position clicks ratio of each ranking position with respect to the query word and obtaining a characteristic value corresponding to the characteristics; and evaluating, by using a machine learning method, the position clicks ratio of each ranking position with respect to the query word based on the obtained characteristic value and history clicks action information of the respective ranking positions.

* * * * *